United States Patent
Yamamoto et al.

(10) Patent No.: US 11,242,659 B2
(45) Date of Patent: Feb. 8, 2022

(54) INSTALLATION DEVICE

(71) Applicant: AICHI STEEL CORPORATION, Tokai (JP)

(72) Inventors: Michiharu Yamamoto, Tokai (JP); Tomohiko Nagao, Tokai (JP); Hitoshi Aoyama, Tokai (JP); Masayoshi Fujiya, Tokyo (JP); Shin Takeuchi, Tokyo (JP); Hideto Takeishi, Tokyo (JP); Taizo Nishiyama, Tokyo (JP)

(73) Assignee: AICHI STEEL CORPORATION, Tokai (JP)

( * ) Notice: Subject to any disclaimer, the term of this patent is extended or adjusted under 35 U.S.C. 154(b) by 18 days.

(21) Appl. No.: 16/770,653

(22) PCT Filed: Dec. 10, 2018

(86) PCT No.: PCT/JP2018/045362
§ 371 (c)(1),
(2) Date: Jun. 8, 2020

(87) PCT Pub. No.: WO2019/117098
PCT Pub. Date: Jun. 20, 2019

(65) Prior Publication Data
US 2021/0172133 A1 Jun. 10, 2021

(30) Foreign Application Priority Data
Dec. 12, 2017 (JP) .............................. JP2017-237529

(51) Int. Cl.
*E01C 23/18* (2006.01)
*E01F 9/512* (2016.01)

(52) U.S. Cl.
CPC .............. *E01C 23/18* (2013.01); *E01F 9/512* (2016.02)

(58) Field of Classification Search
CPC .................................. E01F 9/512; E01C 23/18
See application file for complete search history.

(56) References Cited

U.S. PATENT DOCUMENTS

| 4,957,391 A * | 9/1990 | Kniesel .................. A63C 19/06 111/113 |
| 2015/0294566 A1 | 10/2015 | Huang |

(Continued)

FOREIGN PATENT DOCUMENTS

| CN | 105822226 A | 8/2016 |
| DE | 1188112 B | 3/1965 |

(Continued)

OTHER PUBLICATIONS

Extended European Search Report for corresponding European Patent Application No. 18888520.6, dated Jun. 8, 2021.

(Continued)

*Primary Examiner* — Abigail A Risic
(74) *Attorney, Agent, or Firm* — Renner, Otto, Boisselle & Sklar, LLP

(57) ABSTRACT

Installation cart for laying a magnetic marker in a road to achieve driving assist control on a vehicle side has boring drill at each of front and rear of vehicle body, the boring drill boring accommodation hole as a laying position for the magnetic marker in road surface, is capable of boring accommodation holes at two locations with a predetermined space without moving in a state of being parked at any position, and is capable of performing efficient laying operation without requiring, for example, positioning of installation cart for enhancing accuracy of a space between these accommodation holes at two locations forming the laying positions.

4 Claims, 7 Drawing Sheets

(56) References Cited

U.S. PATENT DOCUMENTS

| | | | |
|---|---|---|---|
| 2016/0356005 A1 | 12/2016 | Dolinar et al. | |
| 2019/0031076 A1* | 1/2019 | Yamamoto | G05D 1/021 |
| 2019/0098468 A1* | 3/2019 | Yamamoto | G08G 1/056 |
| 2020/0110420 A1* | 4/2020 | Yamamoto | G08G 1/00 |
| 2020/0133299 A1* | 4/2020 | Yamamoto | E01F 11/00 |
| 2020/0320870 A1* | 10/2020 | Yamamoto | G08G 1/056 |
| 2020/0332483 A1* | 10/2020 | Michiharu | E01C 23/185 |
| 2020/0357027 A1* | 11/2020 | Yamamoto | G06Q 30/02 |
| 2021/0101497 A1* | 4/2021 | Schmitt | G05D 1/0261 |

FOREIGN PATENT DOCUMENTS

| | | |
|---|---|---|
| DE | 3018693 A1 | 11/1981 |
| EP | 1486616 A1 | 12/2004 |
| FR | 2412652 A1 | 7/1979 |
| JP | 10-181691 A | 7/1998 |
| JP | H11312294 A | 11/1999 |
| JP | 2000-212922 A | 8/2000 |
| JP | 2000-355914 A | 12/2000 |
| JP | 2001-303525 A | 10/2001 |
| JP | 2003-253665 A | 9/2003 |
| JP | 2005-202478 A | 7/2005 |
| JP | 2008-025163 A | 2/2008 |
| JP | 2017-141596 A | 8/2017 |
| JP | 2017-141623 A | 8/2017 |
| KR | 101133172 B1 | 4/2012 |

OTHER PUBLICATIONS

International Search Report for corresponding Application No. PCT/JP2018/045362, dated Feb. 12, 2019.

* cited by examiner

[FIG. 1]
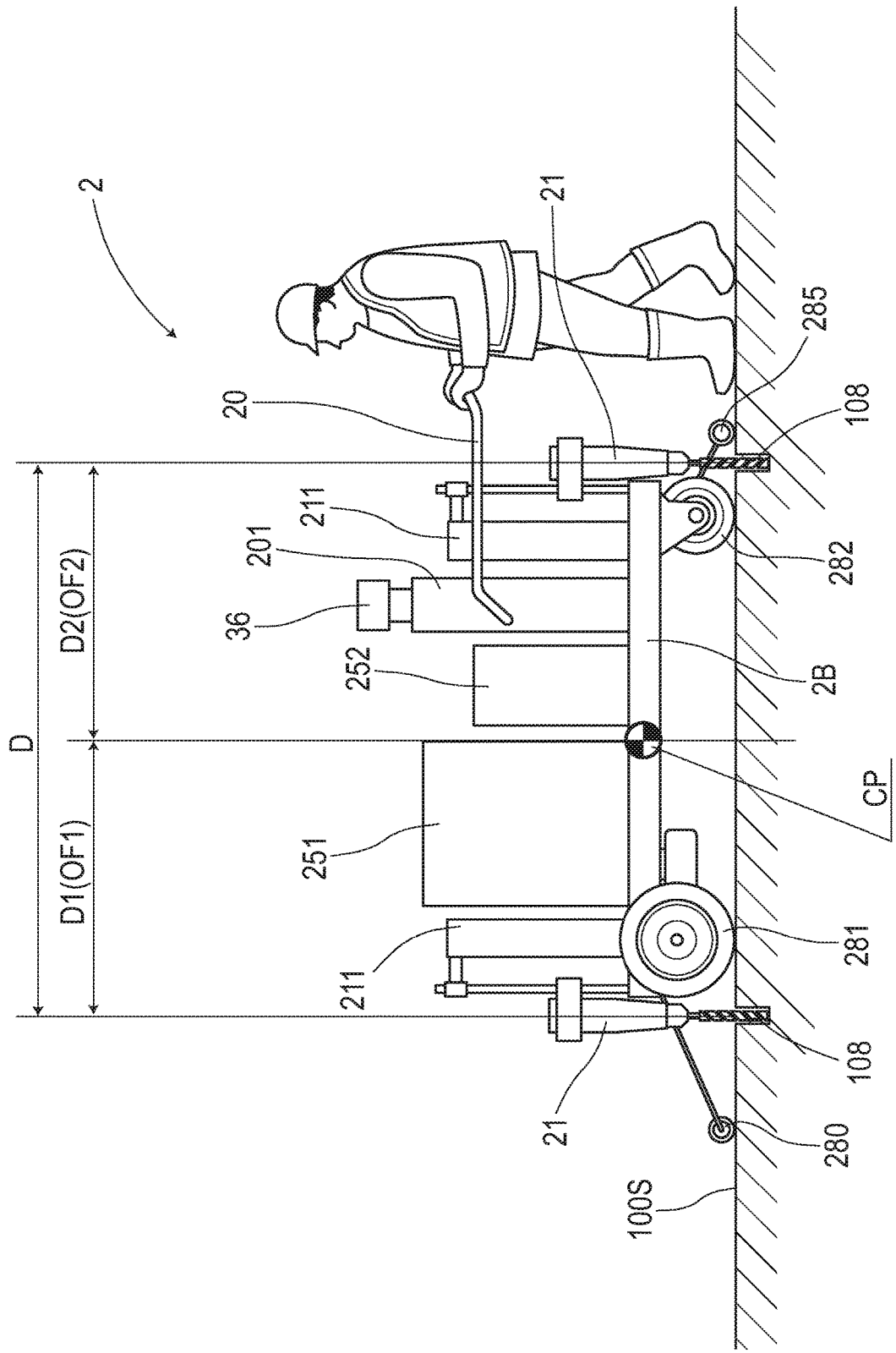

[FIG. 2]
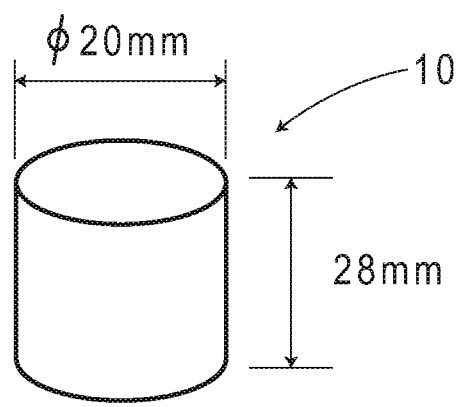

[FIG. 3]
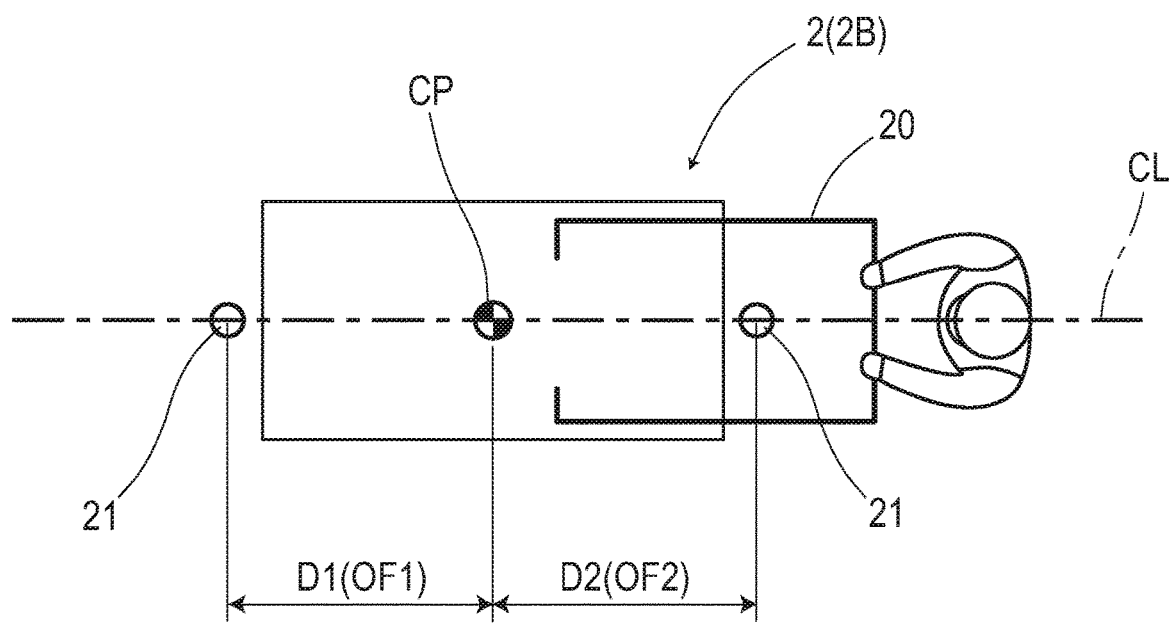

[FIG. 4]
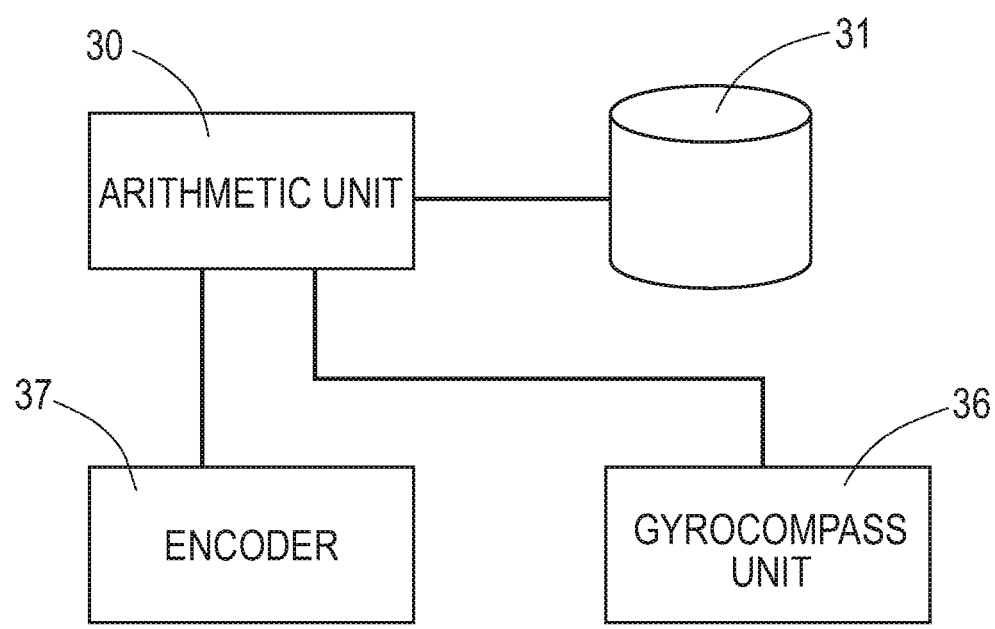

[FIG. 5]
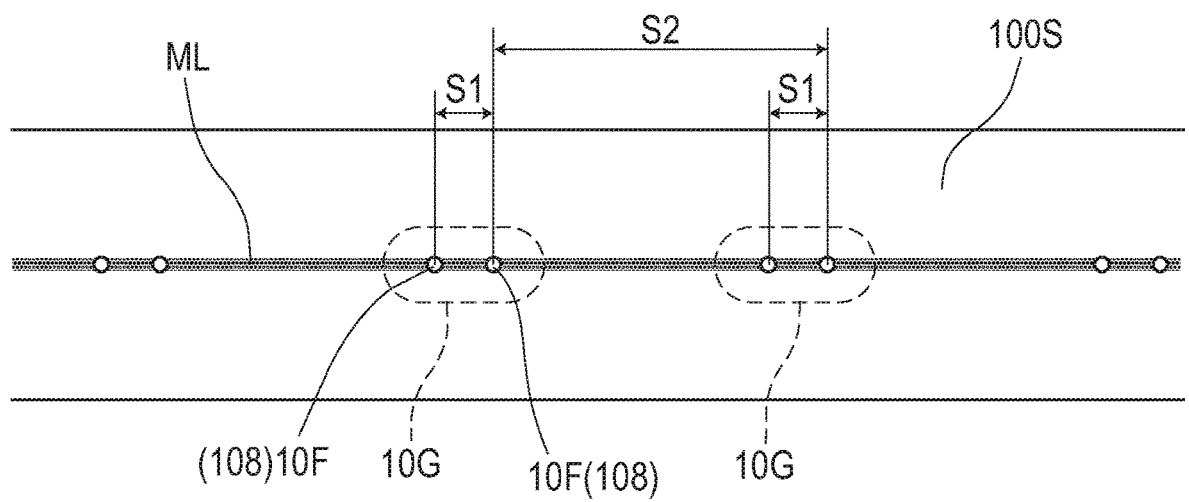

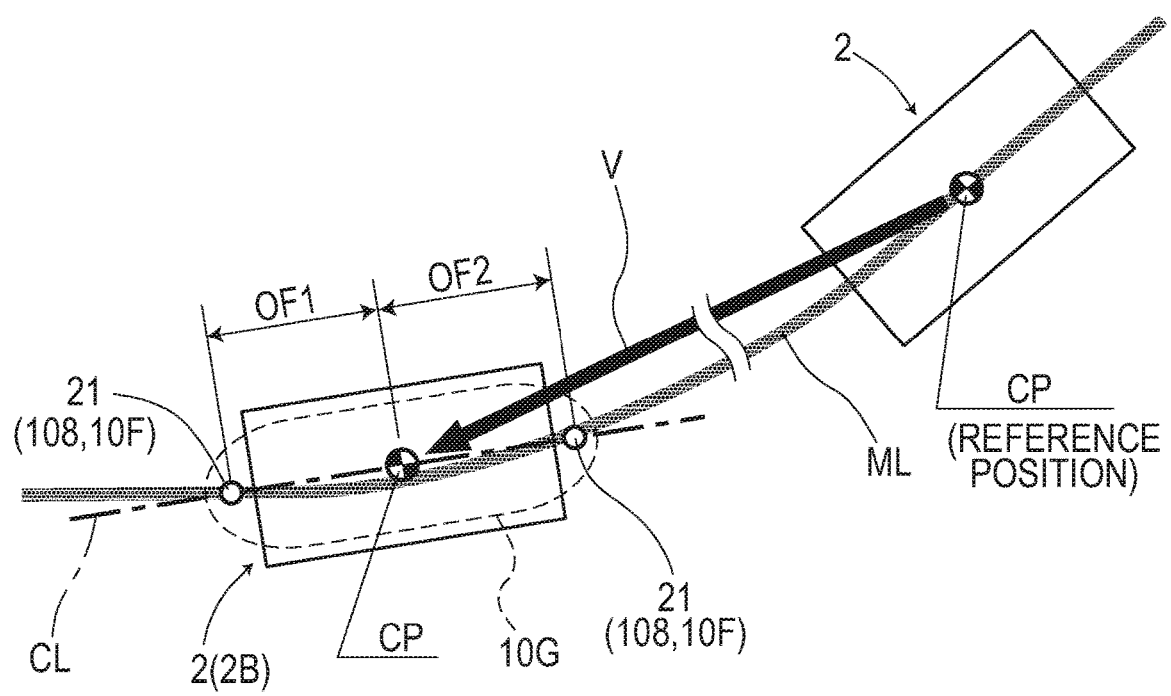
[FIG. 6]

[FIG. 7]
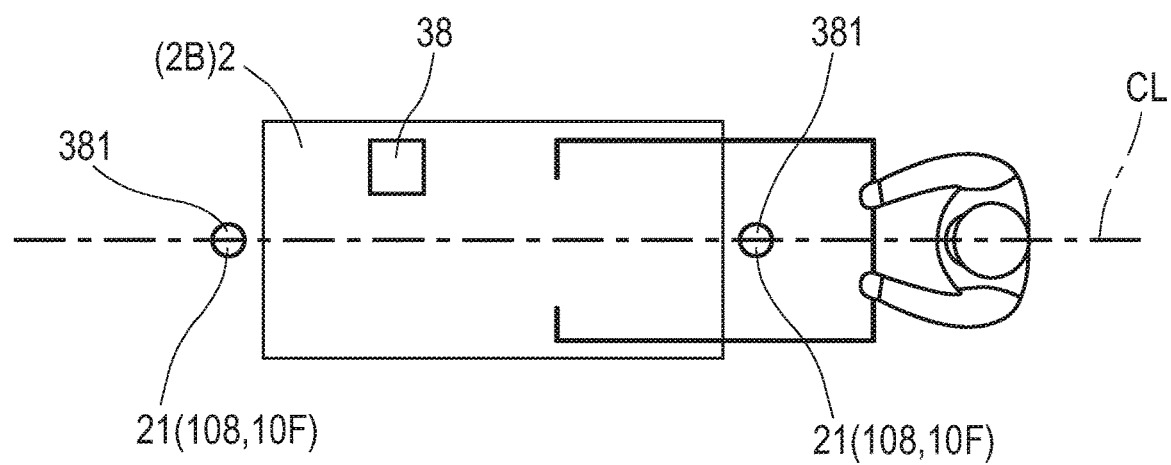

INSTALLATION DEVICE

TECHNICAL FIELD

The present invention relates to an installation device for laying a magnetic marker in a road.

BACKGROUND ART

Conventionally, vehicular marker detection systems for detecting a magnetic marker laid in a road by a magnetic sensor attached to a vehicle have been known (for example, refer to Patent Literature 1). According to this marker detection system, various driving assists, such as automatic steering control, lane departure warning, and automatic driving using magnetic markers laid along a lane, can be achieved.

CITATION LIST

Patent Literature

Patent Literature 1: Japanese Unexamined Patent Application Publication No. 2005-202478

SUMMARY OF INVENTION

Technical Problem

However, the above-described conventional magnetic marker has the following problem. For example, to achieve driving assist such as lane departure warning, it is required to lay many magnetic markers at relatively short spacing with high position accuracy, thereby posing a problem in which installation cost tends to increase.

The present invention was made in view of the above-described conventional problem, and is to provide a magnetic marker installation device capable of suppressing installation cost by efficient installation.

Solution to Problem

The present invention resides in an installation device for laying a magnetic marker in a road, including an operation unit which provides a laying position for the magnetic marker, wherein the installation device is capable of providing the laying position for the magnetic marker at each of a plurality of locations without moving, the plurality of locations having a predetermined relative position relation.

Advantageous Effects of Invention

The installation device of the present invention can provide laying positions for magnetic markers at the plurality of locations without moving. As for the laying positions for the magnetic markers at the plurality of locations provided as the installation device is set at a certain position, accuracy of that relative position relation can be relatively easily ensured. To provide the laying positions for the magnetic markers at the plurality of locations, it is required to position the installation device only once. Therefore, according to the installation device of the present invention, the laying positions for the magnetic markers can be efficiently provided, and installation cost can be suppressed.

As described above, the installation device of the present invention is a useful device capable of suppressing installation cost by efficient installation.

BRIEF DESCRIPTION OF DRAWINGS

FIG. 1 is a descriptive diagram of a laying operation by an installation cart in the first embodiment.

FIG. 2 is a diagram depicting a magnetic marker in the first embodiment.

FIG. 3 is a top view of the installation cart in the first embodiment.

FIG. 4 is a block diagram depicting an electrical structure for achieving inertial navigation in the first embodiment.

FIG. 5 is a descriptive diagram of laying specifications of magnetic markers in the first embodiment.

FIG. 6 is a descriptive diagram of a method of identifying a laying position in the first embodiment.

FIG. 7 is a top view of an installation cart in a second embodiment.

DESCRIPTION OF EMBODIMENTS

In the present invention, as an installation device for laying a magnetic marker in a road, in addition to a device which arranges the magnetic marker in the road, a device which performs a preparation operation and so forth for laying the magnetic marker may be used, the preparation operation including, for example, boring an accommodation hole of the magnetic marker or providing a mark for identifying a laying position on a road. Completion of magnetic-marker laying by the installation device for laying the magnetic marker in the road is not imperative. For example, even if magnetic-marker laying is not completed but operation of boring the accommodation hole is completed, the position of that accommodation hole is determined as the magnetic-marker laying position.

Embodiments of the present invention are specifically described by using the following examples.

First Embodiment

The present embodiment is an example regarding an installation device of performing operation of laying magnetic marker 10 in a road. Details of this are described by using FIG. 1 to FIG. 6.

Installation cart 2 of FIG. 1 is an installation device which provides a laying position for magnetic marker 10 (FIG. 2) in a road. This installation cart 2 bores accommodation hole 108 for accommodating magnetic marker 10 in road surface 100S, thereby determining the laying position for magnetic marker 10. Installation cart 2 includes one boring drill (one example of an operation unit) 21 for boring accommodation hole 108 at each of the front and rear of vehicle body 2B. According to this installation cart 2, accommodation holes 108 (laying positions) can be provided at two locations without moving.

Here, magnetic marker 10 to be installed is a small-sized marker forming a columnar shape having a diameter of 20 mm and a height of 28 mm, as in FIG. 2. A magnet forming magnetic marker 10 is an isotropic ferrite plastic magnet formed by dispersing a magnetic powder of iron oxide as a magnetic material in a polymer material as a base material, and has a characteristic of a maximum energy product (BHmax)=6.4 kJ/m$^3$.

The magnet of magnetic marker 10 is a magnet with a magnetic flux density of the surface being 45 mT (millitesla)

and the magnetic flux density reaching a height of 250 mm from the surface being on the order of 8 μT. The magnet as an isotropic ferrite plastic magnet has a magnetic material being iron oxide, and is thus resistant to corrosion and not required to be accommodated in a metal-made case or the like. Magnetic marker 10 can be directly accommodated and laid in a relatively small accommodation hole 108 (FIG. 1) having, for example, a diameter of 25 mm to 30 mm and a depth on the order of 35 mm to 40 mm.

Installation cart 2 is, as in FIG. 1, a four-wheel vehicle including two driving wheels 281 at left and right on a front side of vehicle body 2B and two freewheels 282 at left and right on a rear side. Driving wheels 281 at left and right on the front side can be individually driven, and can change the orientation of installation cart 2 in accordance with the rotation difference. As for freewheels 282 at left and right on the rear side, the direction of the wheels can be freely changed in accordance with the orientation of installation cart 2. Note that the configuration of the wheels of installation cart 2 may be a three-wheel configuration or a six-wheel configuration.

At the rear part of vehicle body 2B of installation cart 2, hand push handle 20 extending rearward over boring drill 21 on the rear side is provided. An operator can move installation cart 2 by walking while pushing hand push handle 20. Hand push handle 20 is supported in a cantilever manner by operation unit 201 including a sensor, not depicted, for sensing operation forces of both hands of the operator. In accordance with operation forces acting on this hand push handle 20, driving wheels 281 are rotationally driven, thereby causing appropriate assist force. Thus, the operator can move installation cart 2 with a relatively light force. To operation unit 201, a display panel (not depicted) is attached so as to allow the operator to perform visual inspection, and information such as a moving distance of installation cart 2 is displayed.

On the front side of vehicle body 2B, guide roller 280 is attached. With the use of this guide roller 280, visual confirmation as to, for example, whether vehicle body 2B goes along a target line is facilitated. On the rear side of vehicle body 2B, road counter roller 285 is attached for measuring a moving distance.

Installation cart 2 includes, as in FIG. 1, in addition to above-described front and rear boring drills 21, power generator 251 which uses light oil as a fuel, driving cylinder 211 which drives boring drills 21 in a vertical direction, suction cleaner 252 which collects dust such as cuttings and so forth. Boring drills 21 are driven by driving cylinder 211 to advance and retreat in the vertical direction, but are not displaced in a horizontal direction in relation to vehicle body 2B. That is, the positions of boring drills 21 in a horizontal plane along road surface 100S are constantly held in relation to vehicle body 2B. Front and rear boring drills 21 are positioned on center line CL (refer to FIG. 3) of vehicle body 2B. Front and rear boring drills 21 are each 1 m away from center CP of vehicle body 2B in the longitudinal direction (spans D1 and D2 are both 1 m) along center line CL. Therefore, a space between front and rear boring drills 21 in installation cart 2 is a span D=2 m.

Note that a relative position relation between front and rear boring drills 21 with respect to center CP of vehicle body 2B is such that front-side boring drill 21 is 1 m ahead of center CP of vehicle body 2B and rear-side boring drill 21 is 1 m behind center CP of vehicle body 2B. Offset amounts (OF1 and OF2 in FIG. 1 and FIG. 3) representing this relative position relation are set in advance in arithmetic unit 30 (which will be described further below) forming one example of a position information acquisition unit as parameters indicating relative positions of boring drills 21 with respect to center CP of vehicle body 2B.

Installation cart 2 includes, as in FIG. 4, gyrocompass unit (azimuth information acquisition unit) 36 which measures the azimuth (orientation) of centerline CL of vehicle body 2B, encoder 37 which detects a rotation amount of above-described road counter roller 285, and arithmetic unit 30 which finds the boring position of accommodation hole 108 as the laying position for magnetic marker 10.

Gyrocompass unit 36 is a measurement device which measures the azimuth of a measurement target with respect to true north as a reference azimuth. This gyrocompass unit 36 achieves the above-described measurement by using the gyro effect that the rotation axis of the gyroscope horizontally held on the surface of the rotating earth is along south to north. In installation cart 2, gyrocompass unit 36 is set so that the azimuth of the measurement target is along center line CL of the vehicle body. Gyrocompass unit 36 measures the azimuth of center line CL of vehicle body 2B with respect to true north as a reference azimuth, and inputs azimuth information indicating that azimuth to arithmetic unit 30.

Arithmetic unit 30 (FIG. 4) includes an electronic circuit (not depicted) including a CPU (Central Processing Unit) which performs calculation processing, a ROM (Read Only Memory) and a RAM (Random Access Memory) which store parameters and so forth. Arithmetic unit 30 identifies the position (absolute position) of installation cart 2 during laying operation by using inertial navigation, thereby performing arithmetic processing for identifying the boring position of accommodation hole 108 as a laying position. Position information of the laying position is stored in database 31 and accumulated as laying information of magnetic marker 10.

Arithmetic unit 30 computes the moving distance and the relative position of installation cart 2 based on the rotation amount inputted from encoder 37, the azimuth of center line CL inputted from gyrocompass unit 36 and so forth. The moving distance is computed by multiplying an integrated value of rotation amounts detected by encoder 37 by the diameter of road counter roller 285 or the like. The relative position can be computed by integrating instantaneous displacement amounts (moving distances) along the azimuth of center line CL measured by gyrocompass unit 36 after movement from the reference position with its absolute position identified in advance is started. Note in the present embodiment that center CP of vehicle body 2B is set as a position-measurement location and this position is taken as the position of installation cart 2.

Here, the operation of laying magnetic marker 10 is performed by using, in addition to installation cart 2 of FIG. 1 for boring accommodation holes 108, an installation cart (not depicted) which arranges magnetic markers 10 one by one in accommodation holes 108, an installation cart (not depicted) which finishes road surface 100S after arrangement of magnetic markers 10 and so forth. The installation cart for arrangement is an installation device to arrange magnetic markers 10 in accommodation holes 108 and supply a pavement material as an adhesive. The installation cart for finishing the road surface is an installation device which performs operation of cutting a superfluous pavement material swelling from the perimeter of the pavement material after curing the pavement material supplied to accommodation holes 108 to smooth the road surface 100S.

Next, details of the operation of installing magnetic markers 10 by above-configured installation cart 2 are described.

To perform the operation of laying magnetic markers 10, as a preparation, marking line ML (refer to FIG. 5), which is a target line for laying magnetic markers 10, is formed on road surface 100S. Marking line ML can be formed by, for example, a vehicle equipped with a device dropping ink, paint, or the like for marking. If this vehicle is caused to travel along a traveling path such as a lane as an installation target, marking line ML, which is a target line for laying magnetic markers 10, can be formed.

By the operator performing operation of pushing installation cart 2 by hand along above-described marking line ML, the operation of boring accommodation holes 108 as laying positions for magnetic markers 10 can be performed. For example, installation cart 2 is preferably stopped every time the moving distance displayed by the above-described display panel is incremented by 10 m. If boring drills 21 and driving cylinder 211 are operated at every stopping, as in FIG. 5, laying locations 10G can be provided with a span S2=10 m along marking line ML. Here, front and rear boring drills 21 and so forth are preferably each operated during stopping of installation cart 2. In this case, without movement of installation cart 2, accommodation holes 108 (laying positions 10F) adjacent to each other with a span S1=2 m, which matches a span D between boring drills 21, can be formed at two locations for respective laying location 10G.

To start movement of installation cart 2 to provide laying locations 10G along the road, it is required to identify the initial position of installation cart 2 in advance as a reference position. As a method of identifying this reference position, for example, there is a method of using a GPS device (not depicted) which measures an absolute position in advance by using a Global Positioning System (GPS). If the environment is such that GPS electric waves are receivable, by setting a GPS antenna at center CP (FIG. 1 and FIG. 3) of vehicle body 2B, the absolute position of center CP of vehicle body 2B can be measured, and this absolute position can be identified as a reference position. Also, for example, the reference position may be identified by measuring the absolute position of center CP of vehicle body 2B by triangulation using surveying devices (not depicted) set at two locations with their absolute positions identified.

During movement of installation cart 2, the computation of the relative position is repeatedly performed by taking the initial position with its absolute position identified as a reference position as described above. Arithmetic unit 30 integrates momentary displacement amounts based on the rotation amounts detected by encoder 37 along momentary azimuths of center line CL of vehicle body 2B inputted from gyrocompass unit 36, thereby computing the relative position of installation cart 2 with respect to the reference position.

In FIG. 6, the relative position calculated by arithmetic unit 30 when installation cart 2 performs laying operation at any laying location 10G is indicated by arrow V. By adding the relative position indicated by this arrow V to the reference position, arithmetic unit 30 identifies the absolute position of center CP for installation cart 2 while performing laying operation.

As described above, in arithmetic unit 30, parameters indicating the arrangement of boring drills 21 are set in advance, such as offset amounts (OF1=1 m, OF2=1 m in FIG. 6) of boring drills 21 with respect to center CP of vehicle body 2B. Arithmetic unit 30 performs computation of, as in FIG. 6, shifting the position along the azimuth of center line CL of vehicle body 2B measured by gyrocompass unit 36 by this offset amount. According to this computation, with reference to the position of center CP of vehicle body 2B, the absolute positions of front and rear boring drills 21 can be identified. With the absolute position of each boring drill 21 identified, the absolute positions of accommodation holes 108 at two locations, that is, the absolute positions of laying positions 10F, can be identified. And, the position information of laying positions 10F identified as described above is stored in database connected to arithmetic unit 30 and accumulated as laying information of magnetic markers 10.

As described above, installation cart 2 of the present embodiment can provide laying positions 10F for magnetic markers 10 at two locations without moving. A space forming the relative position relation between these laying positions 10F at two locations matches the span D=2 m between front and rear boring drills 21 with high accuracy, and has a less possibility of varying for each laying location 10G.

According to installation cart 2, laying positions 10F at two locations adjacent to each other with a space of 2 m can be efficiently provided at respective laying location 10G. To provide laying positions 10F at two locations adjacent to each other with a space of 2 m, it is not required to perform positioning, surveying, or the like of installation cart 2 to achieve the space of 2 m with high accuracy. Therefore, by using installation cart 2, laying positions 10F at two locations can be efficiently provided at respective laying locations 10G with high accuracy, and installation cost can be suppressed.

Also in the present embodiment, while laying location 10G for every 10 m is provided by visual inspection or the like by the operator, the position of installation cart 2 while performing laying operation is measured, thereby identifying the absolute position of laying position 10F. According to this installation, it does not take time and effort such as measuring the position with high accuracy or positioning installation cart 2 at a predetermined position with high accuracy. Thus, laying operation can be performed very efficiently. On the other hand, since the position of installation cart 2 is measured while performing laying operation, highly-accurate position information can be acquired for each laying position 10F.

Installation cart 2 of the present embodiment does not assume position measurement by GPS, and thus can support environments such as the inside of a tunnel where GPS electric waves are not receivable. For example, in the case of a tunnel, the above-described reference position is preferably set by measuring the absolute position of installation cart 2 at an entrance or exit where measurement of the absolute position by GPS can be performed.

While installation cart 2 which includes boring drills 21 at the front and rear and is capable of boring accommodation holes 108 at two locations without moving has been exemplarily described, an installation cart with only one boring drill 21 may be used. In this case, a plurality of accommodation holes 108 can be preferably bored by moving boring drill 21 in a horizontal plane along road surface 100S. Also, an installation cart including three or more boring drills 21 may be used. In this case, boring drills 21 need not be arrayed on one straight line. Three boring drills 21 may be provided so as to form, for example, a triangle. In this case, by identifying the azimuth of center line CL of vehicle body 2B, the orientation of the triangle forming the arrangement shape of three laying positions bored by these three boring drills 21 can be identified. The orientation of the triangle can be represented by a deviation angle with respect to the azimuth serving as a reference for, for example, any side of the triangle, a bisector equally dividing the angle of any apex, or the like.

In the present embodiment, the configuration has been exemplarily described in which position information indicating the absolute position of each laying position 10F is stored in database 31 and accumulated as laying information of magnetic markers 10. In addition to the position information of each laying position 10F, azimuth information indicating the orientation of a line segment (one example of an arrangement shape) connecting laying positions 10F at two locations in respective laying locations 10G may also be stored. Having a predetermined relation (a match in the present embodiment) with the azimuth of centerline CL of installation cart 2 (vehicle body 2B) while performing laying operation, the azimuth of this line segment can be easily identified based on the azimuth of center line CL measured by gyrocompass unit 36. In operation of the road where magnetic markers 10 are laid, if the azimuth (orientation) of the line segment connecting laying positions 10F at two locations is known, the traveling direction of a vehicle passing over these laying positions 10F at two locations and so forth can be detected with high accuracy.

Second Embodiment

The present embodiment is an example in which a GPS unit forming one example of the position information acquisition unit is added to the installation cart of the first embodiment. Details of this are described with reference to FIG. 7.

GPS unit 38 is, as in FIG. 7, a unit which receives electric waves from a GPS satellite to measure its absolute position. This GPS unit 38 supports measurement by RTK (RealTime Kinematic)-GPS. GPS unit 38 performs a baseline analysis using a signal received by a fixed station with its absolute position identified, and this can identify a baseline vector from the fixed station to GPS unit 38 to measure the absolute position with high accuracy.

While installation cart 2 of the present embodiment includes one GPS unit 38 which measures the absolute position, this GPS unit 38 has two GPS antennas 381 connected thereto. GPS unit 38 measures absolute positions of the installation locations of respective GPS antennas 381. In the present embodiment, since GPS antennas 381 are respectively attached directly above front and rear boring drills 21, the position of each boring drill 21 is a position-measurement location. As for this installation cart 2, two absolute positions measured by GPS unit 38 are boring positions for accommodation holes 108 and laying positions 10F for magnetic markers 10.

With installation cart 2 of the present embodiment, in a condition in which GPS electric waves are receivable, laying position 10F for magnetic marker 10 can be identified by using GPS. In a condition in which the GPS electric waves reception condition is insufficient, as in the first embodiment, laying position 10F for magnetic marker 10 can be identified by using inertial navigation. In this manner, by selectively using either of the method of identifying the laying position, the operation of laying magnetic markers 10 including generation of laying information of magnetic markers 10 can be more efficiently performed irrespective of the condition.

Note that while the example has been described in which GPS antennas 381 are respectively attached directly above two boring drills 21 in the second embodiment, GPS antenna 381 may be attached directly above only either one of boring drills 21. In this case, based on the absolute position of one boring drill 21 measured by the GPS, the absolute position of the other boring drill 21 can be identified. For example, based on the absolute position of one boring drill 21, the absolute position of the other boring drill 21 may be identified by shifting the position along the azimuth of center line CL of vehicle body 2B measured by gyrocompass unit.

Note that other configurations and operations and effects are similar to those of the first embodiment.

In the foregoing, specific examples of the present invention are described in detail as in the embodiments, these specific examples merely disclose examples of technology included in the scope of claims for patent. Needless to say, the scope of claims for patent should not be restrictively construed based on the configuration, numerical values and so forth of the specific examples. The scope of claims for patent includes techniques acquired by variously modifying, changing, or combining as appropriate the above-described specific examples by using known techniques, knowledge of a person skilled in the art, and so forth.

REFERENCE SIGNS LIST 10 magnetic marker
10F laying position
10G laying location
108 accommodation hole
2 installation cart (installation device)
2B vehicle body
20 hand push handle
21 boring drill (operation unit)
285 road counter roller
30 arithmetic unit (position information acquisition unit)
31 database
36 gyrocompass unit (azimuth information acquisition unit)
37 encoder
38 GPS unit (position information acquisition unit)
381 GPS antenna

The invention claimed is:

1. An installation device for laying a magnetic marker in a road, comprising:
an operation unit which provides a laying position for the magnetic marker, wherein
the installation device is capable of providing the laying position for the magnetic marker at each of a plurality of locations without moving, the plurality of locations having a predetermined relative position relation, and
further comprising an azimuth information acquisition unit which acquires azimuth information for identifying an orientation of an arrangement shape of the plurality of the laying positions for the plurality of the magnetic markers at the plurality of locations.

2. The installation device in claim 1, wherein the installation device comprises a plurality of the operation units and, in the installation device, each of a plurality of the operation units is arranged for each of a plurality of the laying positions for a plurality of the magnetic markers at the plurality of locations.

3. The installation device in claim 1, wherein the installation device is provided with a position-measurement location where a relative position relation with the operation unit is identified, and comprises a position information acquisition unit for acquiring position information of the position-measurement location.

4. The installation device in claim 2, wherein the installation device is provided with a position-measurement location where a relative position relation with the operation unit is identified, and comprises a position information acquisition unit for acquiring position information of the position-measurement location.

\* \* \* \* \*